United States Patent [19]

Harwood

[11] 3,835,574
[45] Sept. 17, 1974

[54] FISHHOOK EXTRACTOR
[76] Inventor: Ralph Russell Harwood, 1030 Chalmers, Detroit, Mich. 48215
[22] Filed: Apr. 2, 1973
[21] Appl. No.: 347,327

[52] U.S. Cl. .............................................. 43/53.5
[51] Int. Cl. ........................................... A01k 97/00
[58] Field of Search ...................... 43/53.5; 294/65.5

[56] References Cited
UNITED STATES PATENTS
253,363    2/1882    Foard ................................ 43/53.5
3,154,879  11/1964   Crooke .............................. 43/53.5
D157,255   2/1950    Hamel ................................. D31/4
D183,858   11/1958   Newman ............................. D31/4

Primary Examiner—G. E. McNeill
Attorney, Agent, or Firm—Whittemore, Hulbert & Belknap

[57] ABSTRACT

The present invention relates to a fishhook extractor for removing a fishhook embedded in a fish's mouth comprising an elongated handle having a bifurcated end portion with a magnet disposed at said end portion for engaging and holding the fishhook.

5 Claims, 6 Drawing Figures

PATENTED SEP 17 1974  3,835,574
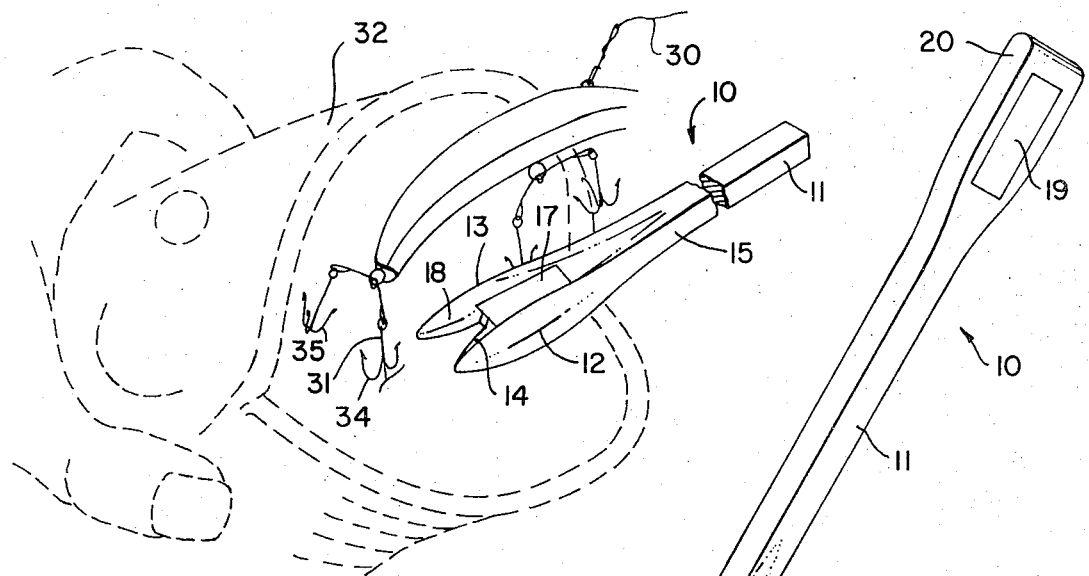
FIG. 1
FIG. 2
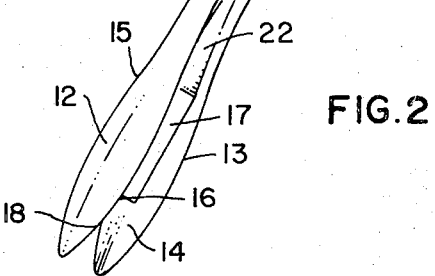
FIG. 3
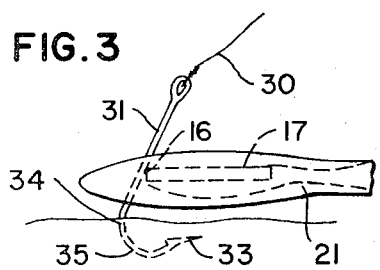
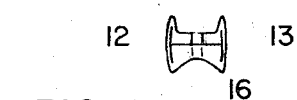
FIG. 4
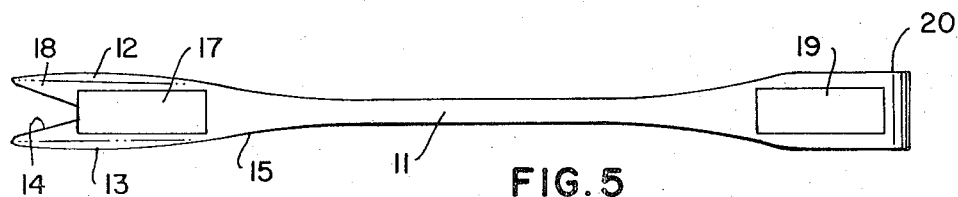
FIG. 5
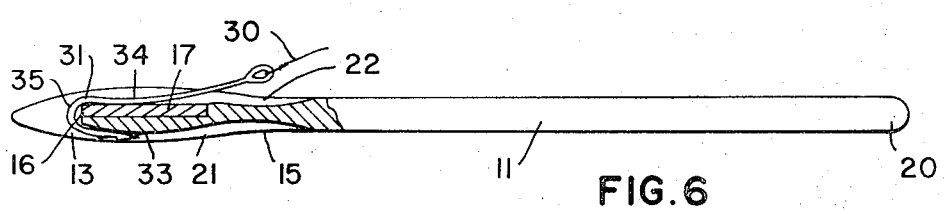
FIG. 6

FISHHOOK EXTRACTOR

BRIEF SUMMARY OF THE INVENTION

This application is based on United States application Ser. No. 364,217, filed May 1, 1964, now abandoned.

According to the present invention there is provided a fishhook extractor having a magnet containing end adapted to extract fishhooks from a fish after the fish has been caught on said hook. The fishhook extractor comprises a handle, and one end portion having a magnet insert to which the disembedded fishhook attaches, rails on either side of the end portion to guide the end onto the shank of the embedded fishhook, and a V-shaped guide structure to engage the hook and guide it into contact with the magnet.

DESCRIPTION OF THE DRAWINGS

FIG. 1 is a perspective view of the fishhook extractor of the present invention in use.

FIG. 2 is a perspective view of the fishhook extractor of the present invention.

FIG. 3 is a fragmentary side elevational view of the fishhook extractor with a fishhook and line in proper relation in the extractor.

FIG. 4 is a front end view of the fishhook extractor of the present invention.

FIG. 5 is a top plan view of the fishhook extractor of the present invention.

FIG. 6 is a side sectional view of the fishhook extractor of the present invention.

DETAILED DESCRIPTION

The present invention relates to a fishhook extracting device for removing a fishhook from a fish after it has been caught. When a fish has been caught on a hook it is often difficult to extricate the hook from the fish, especially if the hook is of a multiple variety such as a treble hook, or if there is a gang of hooks on a lure. The usual procedure heretofore has been for the fisherman to probe with his fingers in the mouth of a fish in order to grasp and remove the hooks. This procedure is dangerous since the fingers of the fisherman can become ensnared on the hooks, especially in the multiple variety of hooks such as the aforementioned treble hooks.

With the present invention there is no need for the fisherman to insert his fingers into the mouth of the fish to remove the embedded hook therefrom. Rather, the entire procedure of removing the hook can be done simply, efficiently and safely by the use of the fishhook extractor of the present invention.

Referring in greater detail to the drawing, there is shown a fishing line 30 to which is connected a fishhook 34, having a shank portion 31 and a throat portion 35, of a single barb 33 type. The hook is embedded by means of the barb 33 in the mouth of a fish 32. The fishhook extractor 10 which is used to disembed and remove the hook from the fish's mouth comprises an elongated handle portion 11 having two end portions 20 and 15. The extractor 10 can be formed of any number of relatively hard materials such as metals or plastics. One metal which has been found to be particularly suitable is aluminum.

The one end 20 is enlarged and has a permanent magnet 19 embedded therein on all sides except its top surface. The top surface is exposed for securing said fishhook extractor to a tackle bos, belt buckle of the fisherman, or any other convenient metallic article.

The other end 15 of the fishhook extractor is adapted to engage and remove a fishhook 34 embedded in a fish's mouth or throat. The end 15 includes a permanent magnet 17 embedded therein on all sides except its top surface and a narrow slot at its front end. The magnet is provided to facilitate removal of the fishhook as will appear more clearly hereinafter. On either side of said magnet 17 are located, as best seen in FIGS. 1, 2 and 3, a pair of laterally spaced rails 12, 13 having generally flat outer surfaces and convexly curved top and bottom edges. As shown in FIG. 6, the rails 12, 13 form a bifurcated structure with their inner or opposed surfaces 14, 18 converging rearwardly from the front end to form a V-shaped guide. The two converging inner surfaces 18,14 of the rails 12,13 do not quite meet thus forming slot or opening 16 into the recess containing magnet 17 so as to expose a narrow area of the forward side of the magnet 17 The exposed forward side of magnet 17 thus defines the inner or convergent end of the V-shaped guide.

From FIGS. 3 and 6 it can be seen that the handle end 15 is relieved top and bottom providing recesses 21, 22 to better accommodate the fishhook so that it may be accommodated flat within the rails 12,13 in which position it is carried free of the fish's mouth. The relieved areas extend from the front of the magnet 17 at the inner end of the V-shaped guide and terminate at a point slightly to the rear of the magnet In the practice of the process embodying the invention the wriggling fish with the fishhook embedded in its mouth is held by one hand by the fisherman and squeezed, preferably at its gills, to widen its mouth while the handle 11 is gripped with the other hand to insert the end 15 within the throat of the embedded fishhook as shown in FIG. 1. As shown in FIGS. 1 and 3, the rails 12,13 find the shank 31 of the embedded fishhook and the end 15 of the fishhook extractor rides down the shank guided by the V-shaped guide into the throat 35 of the fishhook and upon being pushed open via the handle 11 disembeds the fishhook 34 from the fish whereupon the fishhook magnetically attaches to the magnet 17, as shown in FIG. 6. The handle is, of course, turned by the user so that the magnet 17 is properly positioned for contact with the fishhook shank. From FIG. 6 it can also be seen that the relieved areas or recesses 21,22 accommodate the fishhook so that its shank may lie flat against the magnet 17 and handle 11 and may be fitted totally within the dimension of the rails 12,13 in which position it is carried free of the fish's mouth. This greatly minimizes the chance of the hook accidentally snagging on any part of the fish during withdrawal. During the withdrawal of the fishhook extractor and the magnetically attached fishhook the rails 12,13 guard against dislodgment of the fishhook by deflecting any obstacle such as the interior walls of the fish's mouth which might otherwise knock against the fishhook and dislodge it.

In the preferred embodiment, as shown in the drawing, the magnet 17 does not extend transversely through the entire depth of the handle 11. Accordingly, the barbed end portion is not magnetically attracted when disposed in the V-shaped guide as shown and cannot interfere with the magnetic contact between the fishhook shank and the magnet.

Preferably both magnets are exposed on the same side of the handle, here referred to as the top side, so that the user may take it from its position on his tackle box or other metal surface to which it is held by magnet 19 and know immediately where the exposed surface of magnet 17 is when he desires to remove a fishhook.

What I claim as my invention is:

1. A fishhook extractor for disembedding a fishhook embedded in a fish's mouth comprising an elongated handle portion having a bifurcated front end portion, said front end portion including a pair of laterally spaced rails having convexly curved outer edges converging substantially to a point at their front ends and defining a generally V-shaped guide therebetween the sides of which diverge in a forward direction and which is open at the front to receive the fishhook and guide it toward the convergent end of said guide, said front end portion further being relieved on opposite sides thereof between said rails from the convergent end of said V-shaped guide for a limited distance rearwardly thereof to accommodate the shank portion of the fishhook, and a permanent magnet located at the convergent end of said V-shaped guide, which V-shaped guide is truncated at its converging end thereby forming a slot communicating with the transverse front face of said magnet.

2. A fishhook extractor as defined in claim 1 and further including an enlarged rear end portion containing a magnet.

3. The fishhook extractor as defined in claim 1, wherein said permanent magnet in the bifurcated front end portion does not extend transversely through the handle but is exposed in the relieved area on one side only thereof for direct contact with the shank portion of the fishhook.

4. The fishhook extractor as defined in claim 2, wherein said magnet in the rear end portion does not extend transversely through the handle but is exposed only on the same side as the magnet in the front end portion.

5. A fishhook extractor for disembedding a fishhook embedded in a fish's mouth comprising an elongated handle portion having a bifurcated front end portion, said front end portion including a pair of laterally spaced rails having convexly curved outer edges converging substantially to a point at their front ends defining a generally V-shaped guide therebetween the sides of which diverge in a forward direction and which is open at the front to receive the fishhook and guide it toward the convergent end of said guide, said front end portion further being relieved on opposite sides thereof between said rails from the convergent end of said V-shaped guide for a limited distance rearwardly thereof to accommodate the shank portion of the fishhook, a permanent magnet located at the convergent end of said V-shaped guide, said magnet not extending transversely through the handle but being exposed in the relieved area on one side only thereof for direct contact with the shank portion of the fishhook, said V-shaped guide further being truncated at its converging end thereby forming a slot communicating with the transverse front face of said magnet and an enlarged rear end portion containing a permanent magnet therein.

* * * * *